US008679622B2

(12) United States Patent
Delong et al.

(10) Patent No.: US 8,679,622 B2
(45) Date of Patent: Mar. 25, 2014

(54) CASTING MASS, IN PARTICULAR, FOR THE PRODUCTION OF KITCHEN SINKS, MOLDED SANITARY ARTICLES, KITCHEN WORKTOPS OR THE LIKE

(75) Inventors: Anja Delong, Eppingen-Mühlbach (DE); Andreas Hajek, Brackenheim (DE); Thomas Heck, Aglasterhausen (DE)

(73) Assignee: BLANCO GmbH + Co KG, Oberderdingen (DE)

( * ) Notice: Subject to any disclaimer, the term of this patent is extended or adjusted under 35 U.S.C. 154(b) by 923 days.

(21) Appl. No.: 11/490,397

(22) Filed: Jul. 20, 2006

(65) Prior Publication Data
US 2007/0014952 A1 Jan. 18, 2007

Related U.S. Application Data

(63) Continuation of application No. PCT/EP2005/000592, filed on Jan. 21, 2005.

(30) Foreign Application Priority Data

Jan. 23, 2004 (DE) .......... 10 2004 004 510

(51) Int. Cl.
*B32B 5/16* (2006.01)
*G11B 11/105* (2006.01)

(52) U.S. Cl.
USPC ........... 428/323; 428/332; 428/331; 428/402; 524/401; 523/220

(58) Field of Classification Search
USPC .......... 524/80, 401, 442, 493, 543, 556; 428/323, 402
See application file for complete search history.

(56) References Cited

U.S. PATENT DOCUMENTS

| 4,221,697 | A | | 9/1980 | Osborn et al. ............. 524/853 |
| 4,413,089 | A | | 11/1983 | Gavin et al. ................ 1/524 |
| 5,008,303 | A | * | 4/1991 | Gasser et al. ................ 522/64 |
| 5,218,013 | A | * | 6/1993 | Schock ..................... 523/209 |
| 5,756,211 | A | * | 5/1998 | Ittmann et al. ............. 428/409 |
| 5,800,910 | A | * | 9/1998 | Harke et al. ............... 428/212 |
| 5,882,560 | A | * | 3/1999 | Ittmann et al. ............. 264/122 |
| 6,028,127 | A | * | 2/2000 | Yanagase et al. ............ 523/171 |
| 7,247,667 | B2 | * | 7/2007 | Thompson et al. ........... 524/294 |
| 7,625,445 | B2 | * | 12/2009 | Parekh et al. .............. 106/482 |

FOREIGN PATENT DOCUMENTS

| DE | 24 49 656 | | 12/1974 |
| DE | 43 04 494 | A1 | 8/1994 |
| EP | 0 716 097 | A1 | 6/1996 |
| EP | 0 361 101 | A1 | 4/1999 |
| EP | 1 153 731 | | 11/2001 |
| EP | 1 207 180 | A1 | 5/2002 |
| EP | 1207180 | A1 * | 5/2002 |
| WO | WO 95/23825 | | 9/1995 |
| WO | WO 2005/071000 | | 8/2005 |

OTHER PUBLICATIONS

George Wypych, Handbook of Fillers—A Definitive Users Guide and Databook, 2000, 2nd Edition, pp. (78, 87 and 144).*
English translation (Derwent) of the abstract of EP 1207180 A1), May 2002.*
Mineral Data for Wollastonite, Mar. 2001.*
George Wypych, Handbook of Fillers—A Definitive USers Guide and Databook, 2000, 2nd Edition, pp. (22, 142, 154).*
Data for Kronos®, Sep. 2000.*
Data for Martinal®, Jan. 1997.*
Magnetite flyer, 1993.*
Quartz flyer, 1993.*

* cited by examiner

*Primary Examiner* — Irina Krylova

(57) ABSTRACT

In order to produce a casting mass, in particular, for the production of kitchen sinks, molded sanitary articles and kitchen worktops which reduces the scrap rate linked to flaw characteristics during the production it is suggested that a casting mass be used which comprises a syrup based on an acrylate monomer as well as an inorganic filler material which constitutes a proportion of 45 to 85% by weight of the casting mass, characterized in that the proportion of the filler material comprises a first and a second filler fraction, wherein the first filler fraction consists of filler particles with an unbroken grain shape and the second filler fraction of filler particles with a higher specific density than that of the first filler fraction, and that the weight proportion of the first filler fraction is greater than the weight proportion of the second filler fraction.

12 Claims, No Drawings

CASTING MASS, IN PARTICULAR, FOR THE PRODUCTION OF KITCHEN SINKS, MOLDED SANITARY ARTICLES, KITCHEN WORKTOPS OR THE LIKE

This application is a continuation of International application No. PCT/EP2005/000592 filed on Jan. 21, 2005.

The present disclosure relates to the subject matter disclosed in International application No. PCT/EP2005/000592 of Jan. 21, 2005 and German application No. 10 2004 004 510.0 of Jan. 23, 2004, which are incorporated herein by reference in their entirety and for all purposes.

BACKGROUND OF THE INVENTION

The invention relates to a casting mass, in particular, for the production of kitchen sinks, molded sanitary articles, kitchen worktops or the like, comprising a syrup based on an acrylate monomer as well as an inorganic filler material which constitutes a proportion of 45 to 85% by weight of the casting mass. The invention relates, in addition, to kitchen sinks, molded sanitary articles and kitchen worktops produced with the use of such casting masses.

Such molded articles are normally subject to considerable abrasive wear and tear as well as temperature stressing and so abrasion resistance as well as the resistance to hot and cold cycles are of fundamental importance. It is known from EP 0 361 101 A1 to use filler materials in casting masses of this type which have an unbroken grain shape. Since it is possible with these filler particles to achieve not only good flow properties for the casting mass itself and, therefore, a simplification of the production of the molded articles but it is, in addition, also possible to achieve relatively high packing densities of the filler particles in the surrounding acrylate matrix, one of the main preconditions for a good abrasion resistance of the molded articles, casting masses of this type have manifold uses.

In practice, it has been shown again and again that so-called flow lines occur on the finished molded part, in particular, in the case of more ambitious shapes of the molded articles to be produced. This applies, for example, for kitchen sinks with twin basins or, however, also for molded articles with larger unstructured surface areas, such as, for example, unstructured draining surfaces of kitchen sinks or also for kitchen worktops. Flow lines are to be understood as a directional preference of the filler particles in flow direction of the casting mass which is caused by the filling process, is visually noticeable and, therefore, unwanted. Such an unwanted directional preference is also obtained when the unbroken grain shapes suggested in EP 0 361 101 are used as filler particles which have a low aspect ratio and should, therefore, actually be more insusceptible with respect to a directional preference during the flow of the casting mass.

Depending on the degree of prominence of these flow lines, kitchen sinks or worktops, in particular, are considered to be no longer sellable in accordance with defined quality characteristics and must, consequently, be separated out and disposed of.

In addition, problems repeatedly occur in the case of the casting masses described at the outset in that cavity formations occur in the vicinity of the surfaces, in particular, in the case of high filler proportions and these likewise result in kitchen sinks or molded articles consisting of such casting masses having to be considered to be no longer sellable.

The object of the present invention is to reduce the scrap rate linked to the aforementioned flaw characteristics during the production of molded articles, in particular, in the case of kitchen sinks, molded sanitary articles and kitchen worktops and, accordingly, to suggest a casting mass suitable for this purpose.

SUMMARY OF THE INVENTION

This object is accomplished by a casting mass in accordance with claim 1.

The first filler fraction preferably consists of filler particles with a specific density of ≤2.8 $g/cm^3$ and the second filler fraction preferably consists of filler particles with a specific density of ≤3.3 $g/cm^3$.

It is surprising to find, when using the two filler fractions to be used in accordance with the invention, wherein the one filler fraction has the unbroken grain shape of the filler particles, as recommended in EP 0 361 101, and the second filler fraction has a greater specific density, that the proportion of the molded articles produced which have prominent flow lines may be considerably curtailed if not avoided entirely.

In this respect, particles with an average particle size in the range of 100 to 2000 μm may be used for the first filler fraction, as already described in EP 0 361 101, to which many very good properties of the molded articles obtained are linked, as is generally known. These positive properties of the molded articles obtained are also retained during the use of the casting mass according to the present invention.

The second filler fraction preferably has particles with an average particle size which is in the range of 1 to 2000 μm, preferably 10 to 1000 μm, even more preferred 50 to 500 μm.

The greater specific density of the particles of the second filler fraction leads to a settling behavior of these particles in the casting mass which counteracts the formation of flow lines.

The difference in the specific density of the two filler fractions which is necessary in order to ensure an adequately and distinctly different settling behavior of the particles of the filler fractions depends, on the one hand, on the specific density of the particles of the first filler fraction and, in addition, on the viscosity of the casting mass.

The viscosity of the casting mass is normally adjusted such that the tendency of the particles of the filler fractions to settle is sufficiently inhibited for the filling of the casting mold and the casting mass is, therefore, easy to work with. On the other hand, an enrichment of the filler materials on the visible side of the molded article is desired for certain decors. The grain shape of the particles as well as the particle size also influence the viscosity required.

Often, casting masses are adjusted to a viscosity of approximately 4 Pas to approximately 7 Pas when silicate filler materials (specific density approximately 2.65 $g/cm^3$) with an unbroken grain shape and average particle sizes of 50 μm to 800 μm are used as material for the first filler fraction.

A difference in density of 0.5 $g/cm^3$ in the specific densities of first and second filler fractions already results in pronounced differences in the settling behavior, in particular, when the particles of the second filler fraction have a broken grain shape and with casting masses adjusted to a comparatively low viscosity.

Greater differences in density aid this effect. As soon as the casting mold is turned after filling with the casting mass such that the visible side of the molded article points downwards, a settling movement of the filler materials begins, wherein the varying speeds for the settling of the first and second filler fractions effect an "intermixing" of the stationary casting mass and, as a result, counteract the problem of flow lines.

The specific density of the particles of the second filler fraction is preferably 4 g/cm³ and more, even more preferred 5 g/cm³ and more.

The greater the difference in the specific density, the more distinctive is the effect of the prevention of flow lines.

If the second filler fraction is selected from particles with a broken grain shape, this effect may be intensified further.

In addition, when, according to the invention, the two filler fractions with different specific densities are used it may be observed that the tendency to form cavities in the vicinity of the surface may be curtailed in the case of high filler amounts and so the scrap rate in the case of molded articles with high filler proportions can be reduced.

Higher filler proportions, on the other hand, represent an improved scratch resistance, increased mechanical stability, lower material costs, an improved creep behavior in the case of alterations in temperature and, finally, a better cleanability.

Examples for filler materials with a specific density of ≤2.8 g/cm³ are the silicate fillers, in particular, quartz sand, glass and the like as well as fillers on an aluminum hydroxide basis.

Examples for filler materials with a specific density of ≥3.3 g/cm³ are types of glass doped with metal oxide, metal oxides, for example, magnetite.

Magnetite particles which are obtainable with a splintered, broken grain shape are suitable, in particular, in the case of dark to black color specifications for the molded articles.

Surprisingly, the effect of the curtailment or reduction in the prominence of the flow lines already starts with relatively low proportions of the second filler fraction in the overall amount of the filler material. For example, very good effects are already achieved when the ratio of the weight proportions of the first to the second filler fraction is 20:1. On the other hand, the proportion of the filler particles of the second filler fraction may also be selected to be considerably higher without this appreciably diminishing the properties of the molded articles obtained which are otherwise based on the filler fraction with an unbroken grain shape.

Additional, optical effects may be achieved in the case of the imitation of natural stone decors with considerable latitude, in particular, with the use of particles with a broken grain shape for the second filler fraction.

A preferred, upper limit in the ratio of the weight proportions of the first to the second filler fraction is at a ratio of 2:1.

The astounding effect which is achieved with the mixing in of filler particles having a higher specific density, in particular, of ≥3.3 g/cm³, also finds expression in the following proportioning rule. Pronounced effects are already achieved when the proportion of the second filler fraction in the whole of the casting mass is 2% by weight. This can be increased without problem up to 40% by weight or more without positive qualities of the molded articles being appreciably impaired as a result.

Above all with respect to the process certainty aimed for and, in particular, the curtailment of the flow lines as well as the formation of cavities, 3 to 25% by weight of the second filler fraction in the whole of the casting mass are preferably used. The best results have been obtained with proportions in the range of 5 to 15% by weight of the second filler fraction in the whole of the casting mass.

The syrup used in the casting mass according to the invention, which is based on an acrylate monomer, comprises monomers such as methacrylate monomers, methyl methacrylate monomers and others, such as those which are disclosed, for example, in German patent DE 24 49 656.

The syrup may contain, on the one hand, the monomer and prepolymer dissolved in the monomer which serves for the adjustment of the viscosity of the casting mass, on the one hand, and for the reduction in shrinkage otherwise observed during the hardening of acrylate monomers, wherein a proportion of prepolymer in the range of 20 to 25% in relation to the syrup often leads to the best results.

The use of prepolymers dissolved in the monomers does, however, have the disadvantage that a relatively lengthy dissolving process is required which can also not be shortened to any appreciable degree by increasing the temperature.

Alternatively, it is therefore suggested, and this may also be realized in the case of the present invention, that a syrup consisting essentially of the pure monomer be used and, however, organic filler particles, which can absorb acrylate monomer during swelling and thus serve to modify the viscosity of the casting mass, then be added to the casting mass. In this case, as well, the shrinkage during the hardening of the acrylate monomer can effectively be counteracted.

As a rule, at least approximately 8% by weight of the organic filler particles, in relation to the casting mass, are used for this purpose.

From experience, organic filler particles up to 40% by weight in relation to the overall casting mass can also be used in the case of the casting mass according to the invention and so the viscosity of the casting mass altogether can also be adequately controlled with different proportions of filler materials.

The organic filler particles preferably consist of filled and/or unfilled, at least partially cross-linked polyacrylates.

If higher amounts of organic filler particles are used in the formula, those consisting of filled plastic materials are preferably used.

The filler materials used for the filled plastic materials are, in particular, inorganic particular filler materials, the weight proportion of which is added to the proportion of the inorganic filler materials of the overall formula.

It is, of course, just as conceivable to dissolve smaller amounts of prepolymer in the monomer which already leads to a pronounced saving in the dissolving time and to carry out additional adaptations of the viscosity via the use of organic filler particles.

For the purpose of coloring the molded articles to be produced according to the invention, the particles of the first filler fraction preferably have a color coating at least partially on their surface.

The invention also relates to kitchen sinks which have been produced with the use of a casting mass as described above. The invention relates, in addition, to molded sanitary articles which have been produced with the use of a casting mass as described above. Finally, the invention relates to kitchen worktops which have been produced with the use of a casting mass as described above.

It is common to all these molded articles that they can be produced with a considerably reduced scrap rate, wherein the greatest effect with respect to the decrease in the scrap rate is achieved in the case of kitchen sinks, in particular, those sinks with two integrated basins and/or non-structured draining surfaces. The problems with molded sanitary articles and kitchen worktops are derived analogously from the various difficulties described above, i.e., in the case of molded sanitary articles with a relatively complex shape a particularly pronounced reduction in the scrap rate is achieved since the scrap rate with the conventional casting masses is higher in the case of these molded parts than in the case of simple molded articles.

In the case of kitchen worktops, the problem is curtailed in correspondence with the unstructured draining surfaces of the kitchen sinks and so the use of the casting mass according to the invention is also of particular significance for the production of kitchen worktops.

Altogether, a reduction as far as a complete avoidance of the flaw characteristics of flow lines is obtained. In addition, an improvement in the flow behavior of the casting mass is even achieved which results in shorter filling times for the casting molds.

If required, a considerably higher degree of filler loading can be used, i.e., a higher proportion of the inorganic filler materials in the casting mass.

Furthermore, a reduction in or rather an avoidance of the flaw with respect to the formation of cavities occurs.

Last but not least, a positive observation is that the amount of residual monomer can also be reduced considerably.

These and additional advantages of the invention will be explained in greater detail in the following on the basis of the example.

DETAILED DESCRIPTION OF THE INVENTION

In the case of the examples, a kitchen sink with a granite appearance is produced as molded article with one basin as well as an unstructured draining surface, i.e., a configuration which is very susceptible to the formation of flow lines.

In the following examples and comparative examples, the occurrence of flow lines is checked purely optically in the same way as the occurrence of so-called cavities.

The determination of the amount of residual monomer is carried out as follows:

The residual monomer contained in the molded article is extracted by shattering the molded article and subsequently dissolving or rather swelling the sample in dichloromethane. By adding n-octane as internal standard, the amount of residual monomer may be determined quantitatively with the gas chromatograph.

Comparative Example 1

27 parts by weight of polymer syrup (MMA/PMMA with approximately 20% proportion of prepolymer)
   0.5 parts by weight of a customary cross-linking agent
   0.5 parts by weight of customary peroxidic catalytic agents
   69 parts by weight of silanized, differently colored, unbroken quartz sands with the following main fractions:
     30 parts by weight with a particle size of 0.1-0.6 mm (surface black coated)
     13 parts by weight with a particle size of 0.3-0.8 mm (surface black coated)
     26 parts by weight with a particle size of 0.06-0.3 mm (natural)
   0.1 parts by weight of a customary mold release agent, for example, stearic acid
   3 parts by weight of customary pigments for influencing the color tone The viscosity of the casting mass is adjusted with the aid of pyrogenic silicic acid to approximately 4 to 7 Pas at 25° C.

The hardening in a sink mold takes place under the following conditions:

The casting mass is filled into a casting mold (kitchen sink mold) heated to approximately 40° C. The later visible side is heated up to 103° C. within 2 to 3 mins. The rear side is likewise heated up to 103° C. within 2 to 3 mins but only after 4 mins. The entire cycle time, including the holding time at 103° C., is 13 mins. After the cooling of the kitchen sink produced, this is removed from the mold.

Once the cast sinks had been removed from the mold, a formation of flow lines as well as surface areas with cavity formation were observed.

Amount of residual monomer: 0.39%.

Example 1

26 parts by weight of polymer syrup (MMA/PMMA with approximately 20% proportion of prepolymer)
   0.5 parts by weight of a customary cross-linking agent (as in the Comparative Example)
   0.5 parts by weight of customary peroxidic catalytic agents (as in the Comparative Example)
   57 parts by weight of silanized, differently colored, unbroken quartz sands (specific density approximately 2.65 g/cm$^3$) with the following main fractions:
     16 parts by weight with a particle size of 0.1-0.6 mm (surface black coated)
     14 parts by weight with a particle size of 0.3-0.8 mm (surface black coated)
     27 parts by weight with a particle size of 0.06-0.3 mm (natural)
   15 parts by weight of magnetite with a particle size distribution of 50-210 μm, average particle size approximately 150 μm (specific density 5.2 g/cm$^3$)
   0.1 parts by weight of a customary mold release agent, for example, stearic acid
   1 part by weight of customary pigments for influencing the color tone The viscosity of the casting mass is adjusted with the aid of pyrogenic silicic acid to approximately 4 to 7 Pas at 25° C.

The hardening conditions were the same as in the Comparative Example 1.

Amount of residual monomer: 0.24%; no formation of flow lines, no cavities.

Examples 2 and 3

The proportions of the magnetite filler material (average particle size approximately 150 μm) are varied in the example formula of Example 1. The smaller parts by weight of the second filler fraction have been compensated by correspondingly higher proportions of particles with an unbroken grain shape (particle size 0.1-0.6 mm) and so a comparable overall amount of filler material was always given. The results obtained are summarized in Table 1.

The viscosity of the casting mass is adjusted in Example 2 and in Example 3 with the aid of pyrogenic silicic acid to approximately 4 to 7 Pas at 25° C.

The hardening conditions were the same as in Comparative Example 1.

TABLE 1

| Example | Parts by Weight Magnetite | Amount of residual monomer | Flow Lines | Cavities |
| --- | --- | --- | --- | --- |
| 1 | 15 | 0.24 | no | no |
| 2 | 10 | 0.34 | no | no |
| 3 | 5 | 0.33 | no | no |
| Comparison 1 | 0 | 0.39 | yes | yes |

Comparative Example 2

In this test series, compositions are tested which are derived from the example formulas in Examples 1 to 3.

Instead of magnetite filler material, quartz powders (specific density 2.65 g/cm³) with a broken (splintered) grain shape of the particle sizes from 100-150 μm and 0.2-1 mm are used. The results are summarized in Table 2.

The viscosity of the casting mass is adjusted with the aid of pyrogenic silicic acid to approximately 4 to 7 Pas at 25° C.

The hardening conditions were the same as in Comparative Example 1.

TABLE 2

| Parts by Weight Particle Size 100-150 μm | Parts by Weight Particle Size 0.2-1 mm | Flow Lines | Cavities |
|---|---|---|---|
| — | 15 | slight | no |
| — | 10 | slight | no |
| — | 5 | slight | no |
| 15 | — | slight | no |
| 10 | — | slight | no |
| 5 | — | moderate | no |
| 5 | 5 | slight | no |
| 2.5 | 2.5 | slight | no |
| 1.5 | 1.5 | moderate | no |

Table 2 shows that with small proportions of a filler fraction with particles with a broken grain shape and the same specific density, the formation of cavities can be avoided and the formation of flow lines reduced.

In comparison with the preferred magnetite filler material—in the case of dark to black color specifications—with a higher specific density of Examples 1 to 3 th respect to the curtailment of the flow lines are, however, worse or they cannot be compensated for completely by higher amounts of the second filler fraction.

In the case of filler material amounts higher than in the Comparative Example 2, the tendency to form flow lines is increased, on the one hand and, on the other hand, the tendency to form cavities in the vicinity of the surface of the molded article again becomes noticeable.

The invention claimed is:

1. Casting mass for the production of kitchen sinks, molded sanitary articles, or kitchen worktops that are free of flow lines, comprising a syrup based on an acrylate monomer as well as an inorganic filler material constituting a proportion of 45 to 85% by weight of the casting mass, wherein the proportion of the filler material comprises a first filler fraction and a second filler fraction, wherein the first filler fraction consists of filler particles with an unbroken grain shape and an average particle size in the range of 100 to 2000 pm, wherein the second filler fraction consists of filler particles with a broken grain shape and an average particle size in the range of 50 to 500 μm and a specific density greater than that of the first filler fraction, wherein the specific density of the particles of the second filler fraction is equal to or greater than 5 g/cm³, and wherein the weight proportion of the first filler fraction is greater than the weight proportion of the second filler fraction, and wherein the proportion of the second filler fraction in the whole of the casting mass is 2 to 40% by weight.

2. Casting mass as defined in claim 1, wherein the ratio of the weight proportions of the first to the second filler fractions is in the range of 20:1 to 2:1.

3. Casting mass as defined in claim 1, wherein the difference in the specific density of the particles of the first and second filler fractions is at least 0.5 g/cm³.

4. Casting mass as defined in claim 3, wherein the specific density of the particles of the first filler fraction is ≤2.8 g/cm³.

5. Casting mass as defined in claim 1, wherein the casting mass comprises organic filler particles.

6. Casting mass as defined in claim 5, wherein the proportion of the organic filler particles is up to 40% by weight, in relation to the casting mass.

7. Casting mass as defined in claim 1, wherein the particles of the first filler fraction have a color coating at least partially on their surface.

8. Kitchen sink produced with the use of a casting mass as defined in claim 1 wherein the kitchen sink is free of flow lines.

9. Molded sanitary article produced with the use of a casting mass as defined in claim 1 wherein the molded sanitary article is free of flow lines.

10. Kitchen worktop produced with the use of a casting mass as defined in claim 1 wherein the kitchen worktop is free of flow lines.

11. Casting mass as defined in claim 1, wherein the proportion of the second filler fraction in the whole of the casting mass is 3 to 25% by weight.

12. Casting mass as defined in claim 11, wherein the proportion of the second filler fraction in the whole of the casting mass is 5 to 15% by weight.

* * * * *